(12) United States Patent
Van Doren et al.

(10) Patent No.: US 11,782,866 B2
(45) Date of Patent: Oct. 10, 2023

(54) TECHNIQUES TO SUPPORT MULITPLE INTERCONNECT PROTOCOLS FOR AN INTERCONNECT

(71) Applicant: Intel Corporation, Santa Clara, CA (US)

(72) Inventors: Stephen R. Van Doren, Portland, OR (US); Rajesh M. Sankaran, Portland, OR (US); David A. Koufaty, Portland, OR (US); Ramacharan Sundararaman, Hillsboro, OR (US); Ishwar Agarwal, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 17/674,030

(22) Filed: Feb. 17, 2022

(65) Prior Publication Data
US 2022/0197847 A1 Jun. 23, 2022

Related U.S. Application Data

(63) Continuation of application No. 15/640,463, filed on Jul. 1, 2017, now abandoned.

(51) Int. Cl.
*G06F 13/42* (2006.01)
*G06F 13/14* (2006.01)
*G06F 13/38* (2006.01)

(52) U.S. Cl.
CPC .......... *G06F 13/4234* (2013.01); *G06F 13/14* (2013.01); *G06F 13/38* (2013.01)

(58) Field of Classification Search
None
See application file for complete search history.

(56) References Cited

U.S. PATENT DOCUMENTS

| 7,936,779 B2 | 5/2011 | Risberg et al. |
| 8,782,321 B2 | 7/2014 | Harriman et al. |

(Continued)

FOREIGN PATENT DOCUMENTS

| CN | 105765544 | 4/2019 |
| EP | 2390969 | 11/2011 |

(Continued)

OTHER PUBLICATIONS

European Search Report and Written Opinion for the EP Application No. EP18827844, dated Feb. 3, 2021, 11 pages.

(Continued)

*Primary Examiner* — Farley Abad
*Assistant Examiner* — Dayton Lewis-Taylor
(74) *Attorney, Agent, or Firm* — Trop, Pruner & Hu, P.C.

(57) ABSTRACT

Embodiments may be generally direct to apparatuses, systems, method, and techniques to detect a message to communicate via an interconnect coupled with a device capable of communication via a plurality of interconnect protocols, the plurality of interconnect protocols comprising a non-coherent interconnect protocol, a coherent interconnect protocol, and a memory interconnect protocol. Embodiments also include determining an interconnect protocol of the plurality of interconnect protocols to communicate the message via the interconnect based on the message, and providing the message to a multi-protocol multiplexer coupled with the interconnect, the multi-protocol multiplexer to communicate the message utilizing the interconnect protocol via the interconnect with the device.

20 Claims, 8 Drawing Sheets

(56) References Cited

U.S. PATENT DOCUMENTS

| | | |
|---|---|---|
| 8,856,420 B2 | 10/2014 | Chandra et al. |
| 8,953,644 B2 | 2/2015 | Chandra et al. |
| 9,164,535 B2 | 10/2015 | Chandra et al. |
| 9,772,970 B2 | 9/2017 | Luo et al. |
| 9,785,556 B2 | 10/2017 | Sundararaman et al. |
| 9,804,989 B2 | 10/2017 | Klein |
| 10,606,785 B2 | 3/2020 | Das Sharma et al. |
| 10,614,000 B2 | 4/2020 | Agarwal et al. |
| 10,698,842 B1 | 6/2020 | Dastidar et al. |
| 10,817,462 B1 | 10/2020 | Dastidar et al. |
| 10,848,595 B2 | 11/2020 | Song et al. |
| 11,030,126 B2 | 6/2021 | Koufaty et al. |
| 11,036,650 B2 | 6/2021 | Agarwal |
| 11,201,838 B2 | 12/2021 | Marolia et al. |
| 11,232,058 B2 | 1/2022 | Jen et al. |
| 2013/0163617 A1 | 6/2013 | Chandra et al. |
| 2014/0114928 A1 | 4/2014 | Beers |
| 2014/0372663 A1 | 12/2014 | Chandra et al. |
| 2015/0032917 A1 | 1/2015 | Nguyen |
| 2019/0065426 A1* | 2/2019 | Das Sharma ....... G06F 13/4282 |
| 2020/0044895 A1 | 2/2020 | Mittal et al. |

FOREIGN PATENT DOCUMENTS

| | | |
|---|---|---|
| EP | 3037972 | 6/2016 |
| WO | 2015099719 | 7/2015 |
| WO | 2019009970 | 1/2019 |

OTHER PUBLICATIONS

International Search Report and Written Opinion for the PCT Application No. PCT/US2018/035047, dated Sep. 21, 2018, 11 pages.

European Patent Office, Extended Search Report dated Oct. 13, 2022 in European Patent Application No. 22164711.8 (14 pages).

* cited by examiner

600

DETECT A MESSAGE TO COMMUNICATE VIA THE INTERCONNECT
605

DETERMINE AN INTERCONNECT PROTOCOL OF THE PLURALITY OF INTERCONNECT PROTOCOLS TO COMMUNICATE THE MESSAGE VIA THE INTERCONNECT BASED ON THE MESSAGE
610

PROVIDE THE MESSAGE TO THE MULTI-PROTOCOL MULTIPLEXER, THE MULTI-PROTOCOL MULTIPLEXER TO COMMUNICATE THE MESSAGE UTILIZING THE INTERCONNECT PROTOCOL VIA THE INTERCONNECT WITH THE DEVICE
615

TECHNIQUES TO SUPPORT MULITPLE INTERCONNECT PROTOCOLS FOR AN INTERCONNECT

CROSS-REFERENCE TO RELATED APPLICATION

The present application is a continuation of U.S. patent application Ser. No. 15/640,463, filed on Jul. 1, 2017, the content of which is hereby incorporated by reference.

TECHNICAL FIELD

Embodiments described herein generally include techniques to support multiple interconnect protocols for a single interconnect.

BACKGROUND

As computing systems are advancing, the components therein are becoming more complex. Thus, the interconnect architecture to couple and communicate between the components is also increasing in complexity to ensure bandwidth and latency requirements are met for optimal component operation. Furthermore, different market segments need different interconnect architectures and protocols to suit the market's needs. For example, these computing systems may provide various processing capabilities that require different add-in cards having physical resources. These add-in cards may be coupled with the baseboard and may require any number of different interconnect protocols. However, connector space on the baseboard may be limited, and a single connector typical supports a single interconnect protocol. Thus, embodiments may be directed to solving these and other problems.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 6 illustrates an example of a third logic flow diagram.

DETAILED DESCRIPTION

Figure 1:
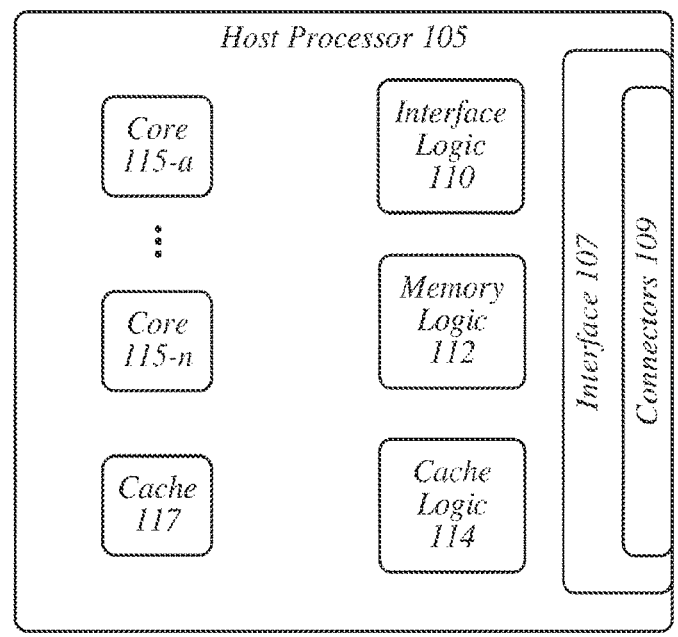
FIG. 1 illustrates an example of a processor device.

Various embodiments may be generally directed to enabling multiple protocols on a single interconnect. More specifically, embodiments include processing messages and data in accordance with an appropriate protocol based on the message type. For example, a message for communication via an interconnect may be detected by interface logic and circuitry. The interface logic and circuitry may detect the message and determine a message type for the message. The interface logic and circuitry may also determine an interconnect protocol of a plurality of interconnect protocols to communicate the message via the interconnect. More specifically, the interface logic and circuitry may determine the interconnect protocol based on a message type, which may include a non-coherent message type, a coherent message type, a memory message type, and so forth. Embodiments are not limited in this manner.

Embodiments may also include providing the message to a multi-protocol multiplexer; the multi-protocol multiplexer may cause communication of the message utilizing the interconnect protocol via the interconnect with the device. In embodiments, the multi-protocol multiplexer may determine whether resources are available for an interconnect specific queue at the destination device. If resources are available, the multi-protocol multiplexer may cause the message to be sent to the device via the interconnect. If resources are not available, the multi-protocol multiplexer may wait until resources are available and send the message. Embodiments are not limited in this manner. These and other details will become more apparent in the following description.

Reference is now made to the drawings, wherein like reference numerals are used to refer to like elements throughout. In the following description, for purposes of explanation, numerous specific details are set forth to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives consistent with the claimed subject matter.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives consistent with the claimed subject matter.

FIG. 1 illustrates an example of an operating environment 100 that may be representative of various embodiments. Operating environment 100 depicted in FIG. 1 illustrates a general overview of a host processor 105 which may be part of a system per some embodiments, such as a computer system, compute system, networking system, distributed system, and the like configured for multi-protocol support per some embodiments. In various instances, host processor 105 may be any type of computational element, such as but not limited to, a microprocessor, a processor, central processing unit, digital signal processing unit, dual-core processor, a quad-core processor, a multi-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, a field-programmable gate array (FPGA) circuit, application specific integrated circuit (ASIC) or any other type of processor or processing circuit on a single chip or integrated circuit. Host processor 105 may have a number of elements, including one or more cores 115a-n, interface logic 110, memory logic 112, and an interface 107 having a number of connectors 109.

In the illustrated example, host processor 105 includes a plurality of cores 115a-n. However, embodiments are not limited in this manner, and host processor 105 may include any number of cores, including a single core. Moreover, the multiple core design can integrate different types of processor cores on the same integrated circuit (IC) die, (for instance, in a heterogeneous design). Thus, one or more cores 115a-n may be different from each other. In some instances, each core of a multiple core design may be the same (for instance, in a homogeneous design).

Cores 115a-n of host processor 105 can read and execute program instructions. The instructions are typically central processing unit (CPU) instructions (such as add, move data, and branch). The multiple core design enables the host processor 105 to execute or run multiple instructions at the same time, increasing overall speed for programs and applications. In some instances, cores 115a-n may be integrated onto a single integrated circuit die (known as a chip multiprocessor or CMP), or onto multiple dies in a single chip package. Also, host processor 105 with a multiple core design can be implemented as symmetrical or asymmetrical multiprocessors.

In some embodiments, host processor 105 may include an interface 107 and connectors 109. Connectors 109 and interface 107 may provide physical connections to couple with other devices, such as interface components, memory, processing cards, networking interface components, accelerator cards, and so forth. Interface 107 and connectors 109 can include one or more wires, bumps, pins, or signal traces capable of communicating information and data via electrical signaling. In some instances, interface 107 and connectors 109 may be coupled with a physical slot capable of accepting processing cards. These processing cards typically provide additional processing and memory, which may be directed to a specific task, for instance, graphics processing, network processing, storage processing, interface processing, and the like. In some embodiments, interface 107 and connectors 109 may provide a common set of pins that support communication via a number of interconnect protocols. Note that in some embodiments, the interface 107 may be coupled with other devices in-die, e.g. on the same integrated chip, or off-die e.g. on different integrated chips or cards as discussed.

In some embodiments, interface 107 and connectors 109 may be part of and enable an interconnect or logical link to send and receive data and messages. The data and messages communicated via the interconnect and the logical link may include data, control messages, memory requests, memory responses, input/output (I/O) requests, I/O responses, and so forth.

Host processor 105 may include interface logic 110 to enable and cause communication of data and messages via interface 107 in accordance with one or more interconnect protocols. In embodiments, the interface logic 110 and interface 107 may support a single interconnect, link, or bus capable of dynamically processing data and messages in accordance with a plurality of interconnect protocols, such as a non-coherent interconnect protocol, a coherent interconnect protocol, and a memory interconnect protocol. Examples of a non-coherent interconnect protocol include Intel® On-Chip Scalable Fabric (IOSF) protocol, peripheral component interconnect (PCI) protocol, peripheral component interconnect express (PCIe or PCI-E) protocol, Intel Accelerator Link (IAL) input/output (I/O) IAL.io protocol, ARM® advanced extensible interface (AXI) protocol, AMD® Hypertransport® protocol, and so forth. Examples of a coherent interconnect protocol may include an intra-device interconnect (IDI) protocol, IAL cache (IAL.cache) protocol, Intel® UltraPath Interconnect® (UPI) protocol, Cache Coherent Interconnect for Accelerators® (CCIX) protocol, AMD® Coherent HyperTransport®, and so forth. Examples of a memory interconnect protocol may include scalable memory interconnect (SMI) protocol, SMI 3rd generation (SMI3), memory protocols, memory semantic protocols, IAL memory (IAL.mem) protocol, GenZ® protocol, and so forth.

In some embodiments, interface logic 110 may be coupled to a multi-protocol multiplexer, as will be discussed in more detail in FIG. 3, such that host processor 105 and components thereof may support multiple protocols for one or more coupled devices. In some embodiments, a device may require support for only one of the interconnect protocols, while other devices may require support for any combination of the interconnect protocols. For example, one class of devices may be considered producer-consumer devices and require support for non-coherent interconnect protocol communication, e.g. PCIe and IOSF. These devices may include a network accelerator, a cryptographic device, a compression device, and so forth. These devices also benefit from support for AiA instructions for basic user level work submission, work submission, flow control, and so forth. The non-coherent interconnect protocol may provide support for device discovery, device configuration, device error reporting, interrupts, dynamic memory addressing (DMA) data transfers, and so forth. In another example, a class of devices may be considered producer-consumer plus devices which may require support for support for device discovery, device configuration, device error reporting, interrupts, dynamic memory addressing (DMA) data transfers, as discussed above with respect to the producer-consumer devices. The producer-consumer plus devices may also require support for an ordering model, execution of atomic operations, and cache coherency. Thus, the interface logic 110 may provide non-coherent interconnect protocol functionality, and coherent interconnect protocol functionality in a dynamic manner. Moreover, the interface logic 110 may provide the coherent interconnect protocol to support atomics and enable a device to issue coherent read and write requests, for example. These producer-consumer plus devices may include fabric interface devices and the like.

In embodiments, the interface logic 110 may provide support for multiple interconnect protocols including a non-coherent interconnect protocol, a coherent interconnect protocol, and a memory interconnects protocol. One class of devices that may require these interconnect protocols may be software assisted device memory devices (SADM) which include devices with an attached memory, and the memory is managed with hardware cache coherence process. Moreover, the performance of the cache coherency process is managed via software or with software assistance. Examples of SADM include, but are not limited to discrete field programmable gate array (FPGA) devices, graphic devices, and so forth. In addition to the above-discussed functionality provided by the non-coherent and coherent interconnect protocols, these devices may include an attached memory and require support such that a processor can access the memory and cache coherency. A memory interconnects protocol may provide access and cache coherency support for the devices. Another class of devices that may require support for a non-coherent interconnect protocol, a coherent interconnect protocol, and a memory interconnect protocol may be autonomous device memory devices and giant cache devices such as dense computational offloading devices, general-purpose computing or graphics processing units (GPGPU), and so forth. These devices may be accelerators with attached memory and include usages where data placement is not practical, e.g. scheduling data movement of prohibitive due to the complexity of the data, or a data footprint is larger than the attached memory.

In embodiments, the interface logic 110 may provide multiple protocols dynamically based on messages and data for communication between the host processor 105 and coupled device. In some instances, the interface logic 110 may determine a message type for the message and determine which interconnect protocol to process the message. More specifically, the interface logic 110 detects a message to communicate via the interconnect. In embodiments, the message may have been generated by a core 115-n or another I/O device and be for communication to a device coupled via the interface 107. The interface logic 110 may determine a message type for the message, such as a non-coherent message type, a coherent message type, and a memory message type. In one specific example, the interface logic 110 may determine whether a message, e.g. a request, is an I/O request or a memory request for a coupled device based on a lookup in an address map. If an address associated with the message maps as an I/O request, the interface logic 110 may process the message utilizing a non-coherent interconnect protocol and send the message to a link controller and multiplexer as a non-coherent message for communication to the coupled device. In another example, the interface logic 110 may determine an address associated with the message indicates the message is memory request based on a lookup in the address table. The interface logic 110 may process the message utilizing the memory interconnect protocol and send the message to the link controller and multiplexer for communication to the coupled device.

In another example, the interface logic 110 may determine a message is a coherent message based on one or more cache coherency and memory access actions (read/write operations) performed. More specifically, the host processor 105 may receive a coherent message or request that is sourced by the coupled device. One or more of the cache coherency and memory access actions may be performed to process the message and based on these actions; the interface logic 110 may determine a message sent in response to the request may be a coherent message. The interface logic 110 may process the message in accordance with the coherent interconnect protocol and send the coherent message to the link controller and multiplexer to send to the coupled device. Embodiments are not limited in this manner. In some embodiments, the interface logic 110 may determine a message type of a message based on an address associated with the message, an action caused by the message, information within the message, e.g. an identifier, a source of the message, a destination of a message, and so forth. Note that message types may be determined for messages both sent and received from or by the host processor 105.

Figure 3:
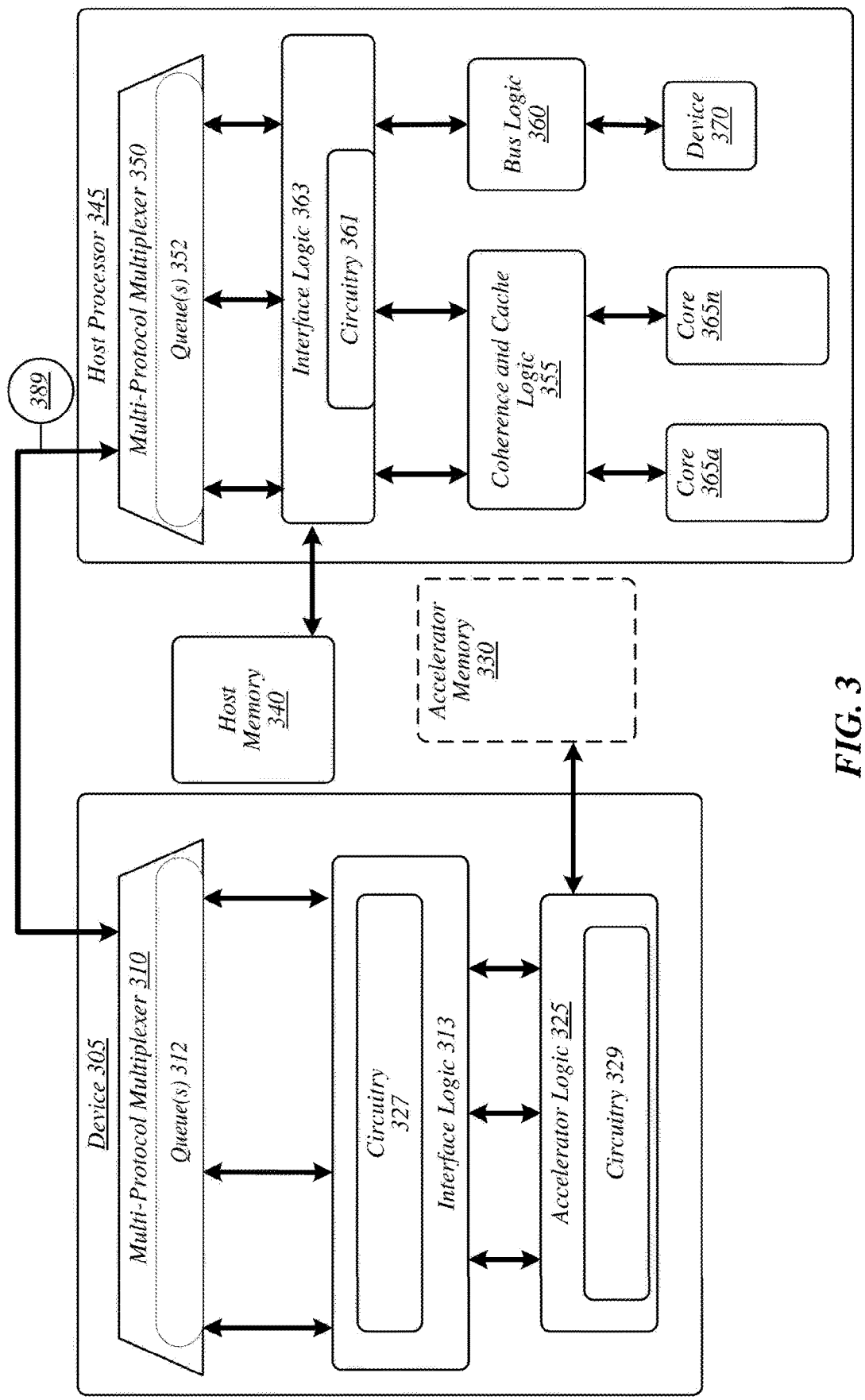
FIG. 3 illustrates an example of another example of an operating environment.

In some embodiments, host processor 105 may include memory logic 112, as discussed in more detail in FIG. 3. Memory logic 112 may perform operations for a memory of host processor 105, such as a dynamic random access memory (DRAM) that may be coupled to the host processor 105 or any other type of memory, which typically is not on the same die as the host processor 105, for example. Memory logic 112 may enable the host processor 105 to read and write data to and from memory (not shown).

In some embodiments, the host processor 105 may include cache 117 and cache logic 114, which may enable a coherency support for cache 117 usage of cores 115a-n of host processor 105. The cache 117 may be in a hierarchical layout having a number of levels, such as a first level cache and a second level cache. In some instances, some amount of cache 117 may be implemented as part of each of the processor cores 115 themselves. Additional cache 117 may be shared among the cores 115 in a hierarchal format. Since there may be two or more processing elements or cores 115a-n working at the same time, it is possible that they simultaneously access the same location of a cache 117. If one of the cores 115a-n changes data in a location, cache logic 117 may notify all the other cores 115a-n of changes to shared values in memory, for example. Embodiments are not limited in this context.

Figure 2:
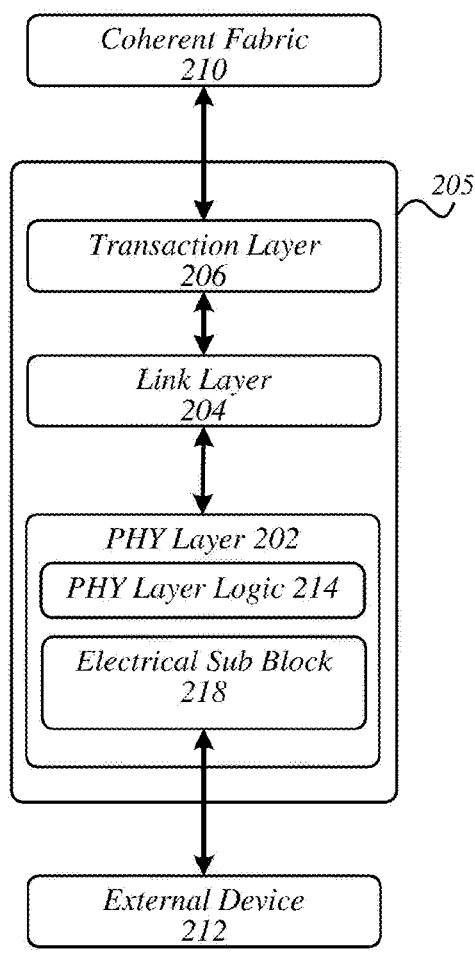
FIG. 2 illustrates an example of an operating environment.

FIG. 2 illustrates an example of an interconnect protocol stack 200 that may be representative of various embodiments. interconnect protocol stack 200 depicted in FIG. 2 illustrates an embodiment of an interconnect protocol stack 200. In general, interconnect protocol stack 200 may include or represent interconnect protocols used by a multi-protocol system according to some embodiments, including, without limitation, a coherent interconnect protocol, a non-coherent interconnect protocol, and a memory interconnect protocol, and/or the like. Note that embodiments, may include a separate interconnect protocol stack 200 for each of the multiple interconnect protocols, each may be representative of interconnect protocol stack 200. However, each protocol stack may conduct specific and/or unique processing based on the particular interconnect protocol. Embodiments are not limited in this context.

Interconnect protocol stack 200 may include a number of layers, such as a transaction layer 206, a link layer 204, and a physical layer (PHY) 202. In various embodiments, portions of interconnect protocol stack 200 may be implemented as part of interface logic 110, interface 107, connectors 109, or any combination thereof. However, embodiments are not limited in this manner, and portions of interconnect protocol stack 200 may be implemented in different elements of host processor 105.

In some embodiments, interconnect protocol stack 200 and interconnect protocols may communicate data between a coherent fabric 210 and a device. Coherent fabric 210 may connect and include cores 115, memory logic 112, memory, cache 117, cache logic 114, and so forth with interface logic 110. Transaction layer 206 may handle data and action requests and messages. Transaction layer 206 may parse the action requests and messages and initiate the appropriate actions in the processor's memory system according to protocol specific rules, such as ordering rules. Transaction layer 206 may also process data and action requests which may include read and write instructions. Action requests may also include cache coherency actions for a memory interconnect protocol and/or coherent interconnect protocol, for example, and address translation actions for non-coherent interconnect protocol, for example. The messages processed by transaction layer 206 may include error messages, request messages, response messages, interrupts, and/or the like.

Transaction layer 206 may provide an interface between cores 115, and interconnect architecture including at least portions of PHY layer 202, which may include interface 107, and connectors 109 coupled to another device. Transaction layer 206 may also communicate information between cores 115 and the processor's coherent fabric and another device via link layer 204 and PHY layer 202 in transaction layer packets (TLPs). As mentioned, this information may include memory reads, memory writes, input/output (I/O), I/O writes, messages, completion, and so forth.

Link layer 204, also referred to as a data link layer may operate as an intermediate stage between transaction layer 206 and PHY 202. In one embodiment, link layer 204 may provide a reliable mechanism for exchanging TLPs between two components in a link. Link layer 204 may append information, for instance, packet sequence identification, to the TLPs when sending data and may remove the information from packets when receiving data. Link layer 204 may also determine and append an error detection code (CRC) to the packet header/payload of the TLPs. Link layer 204 may send the modified TLPs to PHY 206 for transmission across a physical link, for example, interface 107 and connectors 109, to an external device.

In one embodiment, interconnect protocol stack 200 may also include a PHY 202, which may include a logical sub-block 214 and an electrical sub-block 218 to physically transmit a packet to an external device. In some embodiments, PHY 202 may include portions of interface logic 110, interface 107, and connectors 109 or pins.

In some instances, logical sub-block 214 may be divided into a media access control (MAC) sublayer and a physical coding sublayer (PCS). In some instances, the PHY Interface for PCI Express (PIPE), published by Intel® Corp., defines the MAC/PCS functional partitioning and the interface between these two sub-layers. The PIPE specification also identifies the physical media attachment (PMA) layer, which includes the serializer/deserializer (SerDes) circuitry and other analog circuitry.

Logical sub-block 214 may also be responsible for the logical functions of PHY 202. Logical sub-block 214 may include a buffer that may function either as a drift buffer or an elastic buffer. Further, logical sub-block 214 may include a data encoding section, which can encode data using a 128b/130b transmission code, where 130-bit symbols are transmitted/received. In some embodiments, logical sub-block 214 includes a transmit section to prepare outgoing information for transmission by electrical sub-block 218, and a receiver section to identify and prepare received information before passing it to link layer 204. Electrical sub-block 218 includes a transmitter and a receiver to send and receive data. The transmitter is supplied by logical sub-block 214 with symbols and transmits onto an external device. The receiver is supplied with symbols from an external device and transforms the received signals into a bit-stream. The bit-stream is supplied to logical sub-block 214.

FIG. 3 illustrates an example of an operating environment 300 that may be representative of various embodiments. The operating environment 300 depicted in FIG. 3 may include a device 305 operative to provide processing and/or memory capabilities. For example, device 305 may be, an accelerator or processor device communicatively coupled to a host processor 345 via an interconnect 389, which may be single interconnect, bus, trace, and so forth. The device 305 and host processor 345 may communicate over link 389 to enable data and message to pass therebetween. In some embodiments, link 389 may be operable to support multiple protocols and communication of data and messages via the multiple interconnect protocols. For example, the link 389 may support various interconnect protocols, including, without limitation, a non-coherent interconnect protocol, a coherent interconnect protocol, and a memory interconnects protocol. Non-limiting examples of supported interconnect protocols may include PCI, PCIe, USB, IDI, IOSF, SMI, SMI3, IAL.io, IAL.cache, and IAL.mem, and/or the like. For example, the link 389 may support a coherent interconnect protocol (for instance, IDI), a memory interconnect protocol (for instance, SMI3), and non-coherent interconnect protocol (for instance, IOSF).

In embodiments, the device 305 may include accelerator logic 325 including circuitry 329. In some instances, the accelerator logic 325 and circuitry 329 may provide processing and memory capabilities. In some instances, the accelerator logic 325 and circuitry 329 may provide additional processing capabilities in conjunction with the processing capabilities provided by host processor 345. Examples of device 305 may include producer-consumer devices, producer-consumer plus devices, software assisted device memory devices, autonomous device memory devices, and giant cache devices, as previously discussed. The accelerator logic 325 and circuitry 329 may provide the processing and memory capabilities based on the device. For example, the accelerator logic 325 and circuitry 329 may communicate using interconnects using, for example, a coherent interconnect protocol (for instance, IDI) for various functions, such as coherent requests and memory flows with host processor 345 via interface logic 313 and circuitry 327. The interface logic 313 and circuitry 327 may determine an interconnect protocol based on the messages and data for communication. In another example, the accelerator logic 325 and circuitry 329 may include coherence logic that includes or accesses bias mode information. The accelerator logic 325 including coherence logic may communicate the access bias mode information and related messages and data with host processor 345 using a memory interconnect protocol (for instance, SMI3) via the interface logic 313 and circuitry 327. The interface logic 313 and circuitry 327 may determine to utilize the memory interconnect protocol based on the data and messages for communication.

In some embodiments, the accelerator logic 325 and circuitry 329 may include and process instructions utilizing a non-coherent interconnect, such as a fabric-based protocol (for instance, IOSF) and/or a peripheral component interconnect express (PCIe or PCI-E) protocol. In various embodiments, a non-coherent interconnect protocol may be utilized for various functions, including, without limitation, discovery, register access (for instance, registers of device 305), configuration, initialization, interrupts, direct memory access, and/or address translation services (ATS). Note that the device 305 may include various accelerator logic 325 and circuitry 329 to process information and may be based on the type of device, e.g. producer-consumer devices, producer-consumer plus devices, software assisted device memory devices, autonomous device memory devices, and giant cache devices. Moreover and as previously discussed, depending on the type of device, device 305 including the interface logic 313, the circuitry 327, the protocol queue(s) 312 and multi-protocol multiplexer 310 may communicate in accordance with one or more protocols, e.g. non-coherent, coherent, and memory interconnect protocols. Embodiments are not limited in this manner.

In various embodiments, host processor 345 may be similar to host processor 105, as discussed in FIG. 1, and include similar or the same circuitry to provide similar functionality. The host processor 345 may be operably coupled to host memory 340 and may include coherence logic (or coherence and cache logic) 355, which may include a cache hierarchy and have a lower level cache (LLC). Coherence logic 355 may communicate using various interconnects with interface logic 363 including circuitry 361 and one or more cores 365a-n. In some embodiments, the coherence logic 355 may enable communication via one or more of a coherent interconnect protocol, and a memory interconnect protocol. In some embodiments, the coherent LLC may include a combination of at least a portion of host memory 340 and accelerator memory 330. Embodiments are not limited in this manner.

Host processor 345 may include bus logic 360, which may be or may include PCIe logic. In various embodiments, bus logic 360 may communicate over interconnects using a non-coherent interconnect protocol (for instance, IOSF) and/or a peripheral component interconnect express (PCIe or PCI-E) protocol. In various embodiments, host processor 345 may include a plurality of cores 365a-n, each having a cache. In some embodiments, cores 365a-n may include Intel® Architecture (IA) cores. Each of cores 365a-n may communicate with coherence logic 355 via interconnects. In some embodiments, the interconnects coupled with the cores 365a-n and the coherence and cache logic 355 may support a coherent interconnect protocol (for instance, IDI). In various embodiments, the host processor may include a device 370 operable to communicate with bus logic 360 over an interconnect. In some embodiments, device 370 may include an I/O device, such as a PCIe I/O device.

In embodiments, the host processor 345 may include interface logic 363 and circuitry 361 to enable multi-protocol communication between the components of the host processor 345 and the device 305. The interface logic 363 and circuitry 361 may process and enable communication of messages and data between the host processor 345 and the device 305 in accordance with one or more interconnect protocols, e.g. a non-coherent interconnect protocol, a coherent interconnect, protocol, and a memory interconnect protocol, dynamically. In embodiments, the interface logic 363 and circuitry 361 may support a single interconnect, link, or bus capable of dynamically processing data and messages in accordance with the plurality of interconnect protocols.

In some embodiments, interface logic 363 may be coupled to a multi-protocol multiplexer 350 having one or more protocol queues 352 to send and receive messages and data with device 305 including multi-protocol multiplexer 310 and also having one or more protocol queues 312. Protocol queues 312 and 352 may be protocol specific. Thus, each interconnect protocol may be associated with a particular protocol queue. The interface logic 363 and circuitry 361 may process messages and data received from the device 305 and sent to the device 305 utilizing the multi-protocol multiplexer 350. For example, when sending a message, the interface logic 363 and circuitry 361 may process the message in accordance with one of interconnect protocols based on the message. The interface logic 363 and circuitry 361 may send the message to the multi-protocol multiplexer 350 and a link controller. The multi-protocol multiplexer 350 or arbitrator may store the message in a protocol queue 352, which may be protocol specific. The multi-protocol multiplexer 350 and link controller may determine when to send the message to the device 305 based on resource availability in protocol specific protocol queues of protocol queues 312 at the multi-protocol multiplexer 310 at device 305. When receiving a message, the multi-protocol multiplexer 350 may place the message in a protocol-specific queue of queues 352 based on the message. The interface logic 363 and circuitry 361 may process the message in accordance with one of the interconnect protocols.

In embodiments, the interface logic 363 and circuitry 361 may process the messages and data to and from device 305 dynamically. For example, the interface logic 363 and circuitry 361 may determine a message type for each message and determine which interconnect protocol of a plurality of interconnect protocols to process each of the messages. Different interconnect protocols may be utilized to process the messages.

In an example, the interface logic 363 may detect a message to communicate via the interconnect 389. In embodiments, the message may have been generated by a core 365 or another I/O device 370 and be for communication to a device 305. The interface logic 363 may determine a message type for the message, such as a non-coherent message type, a coherent message type, and a memory message type. In one specific example, the interface logic 363 may determine whether a message, e.g. a request, is an I/O request or a memory request for a coupled device based on a lookup in an address map. If an address associated with the message maps as an I/O request, the interface logic 363 may process the message utilizing a non-coherent interconnect protocol and send the message to a link controller and the multi-protocol multiplexer 350 as a non-coherent message for communication to the coupled device. The multi-protocol 350 may store the message in an interconnect specific queue of protocol queues 352 and cause the message to be sent to device 305 when resources are available at device 305. In another example, the interface logic 363 may determine an address associated with the message indicates the message is memory request based on a lookup in the address table. The interface logic 363 may process the message utilizing the memory interconnect protocol and send the message to the link controller and multi-protocol multiplexer 350 for communication to the coupled device 305. The multi-protocol multiplexer 350 may store the message an interconnect protocol-specific queue of protocol queues 352 and cause the message to be sent to device 305 when resources are available at device 305.

In another example, the interface logic 363 may determine a message is a coherent message based on one or more cache coherency and memory access actions performed. More specifically, the host processor 345 may receive a coherent message or request that is sourced by the coupled device 305. One or more of the cache coherency and memory access actions may be performed to process the message and based on these actions; the interface logic 363 may determine a message sent in response to the request may be a coherent message. The interface logic 363 may process the message in accordance with the coherent interconnect protocol and send the coherent message to the link controller and multi-protocol multiplexer 350 to send to the coupled device 305. The multi-protocol multiplexer 350 may store the message in an interconnect protocol-specific queue of queues 352 and cause the message to be sent to device 305 when resources are available at device 305. Embodiments are not limited in this manner.

In some embodiments, the interface logic 363 may determine a message type of a message based on an address associated with the message, an action caused by the message, information within the message, e.g. an identifier, a source of the message, a destination of a message, and so forth. The interface logic 363 may process received messages based on the determination and send the message to the appropriate component of host processor 345 for further processing. The interface logic 363 may process a message to be sent to device 305 based on the determination and send the message to a link controller (not shown) and multi-protocol multiplexer 350 for further processing. The message types may be determined for messages both sent and received from or by the host processor 345.

Figure 4:
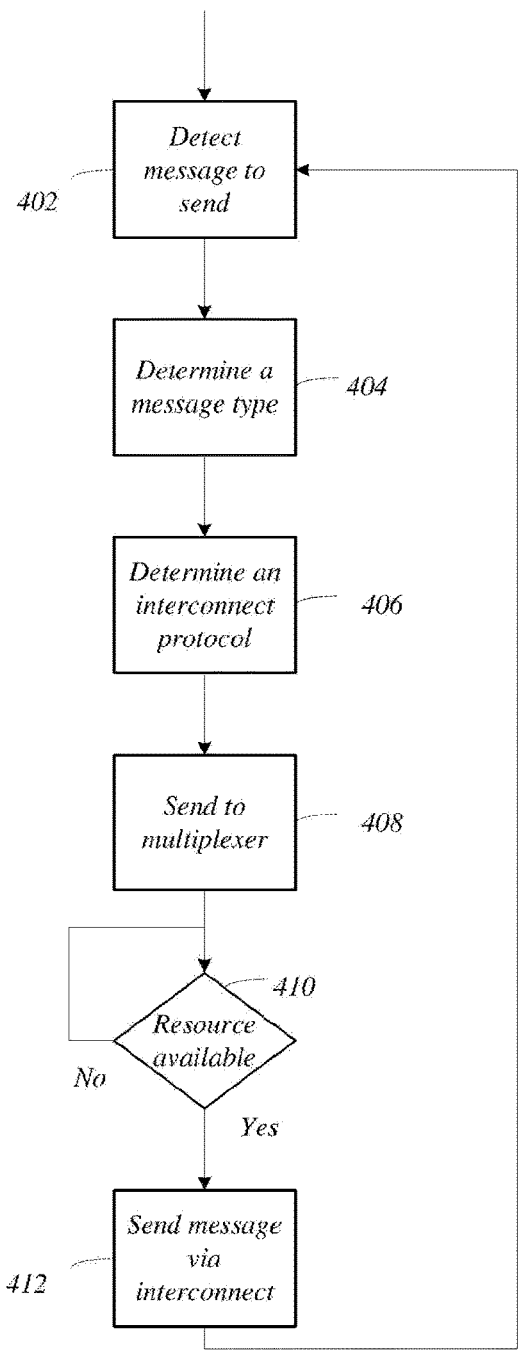
FIG. 4 illustrates an example of a first logic flow diagram.

FIG. 4 illustrates a first logic flow diagram 400 for processing a message and data to send to another device. Although the logic flow diagram 400 illustrates certain operations are occurring in a particular order, embodiments are not limited in this manner. Some operations may occur before or after other operations, and some may occur in parallel. Moreover, the logic flow 400 may be representative of some or all the operations executed by one or more embodiments described herein.

At block 402, embodiments include detecting a message or data to send to a device coupled via a interconnect. The message or data may be generated by a core, an I/O device, or a device coupled via a bus or trace. The message or data may be destined for another coupled device via an interconnect, such as an accelerator device. At block 404, the logic flow may include determining a message type for the message. For example, embodiments may include determining a message type, such as a non-coherent message type, a coherent message type, and a memory message type. The determination may be based on the message, information associated with the message, actions/operations caused by the message, and so forth. At block 406, the logic flow 400 may include determining an interconnect protocol to process the message based on the message type. For example, embodiments may include determining to process the message utilizing one of a non-coherent interconnect protocol, a coherent interconnect protocol, and a memory interconnect protocol based on the message. A non-coherent message type may be processed via non-coherent interconnect protocol, a coherent message type may be processed via the coherent interconnect protocol, and a memory message type may be processed via the memory interconnect protocol, for example. Embodiments are not limited in this manner.

At block 408, the logic flow 400 may include sending the message to a link controller and a multi-protocol multiplexer to send to a coupled device. More specifically, interface logic and circuitry may process the message in accordance with the determined interconnect protocol and send the message to the link controller and multi-protocol multiplexer, which may determine when to send the message to a coupled device. For example and at decision block 410, the multiplexer or arbitrator may determine whether resources are available in a interconnect protocol specific are available to send the message. If not, the logic flow 400 may wait until resources are available. If resources are available at block 410, the logic flow 400 may include sending the message to a coupled device via an interconnect at block 412.

Figure 5:
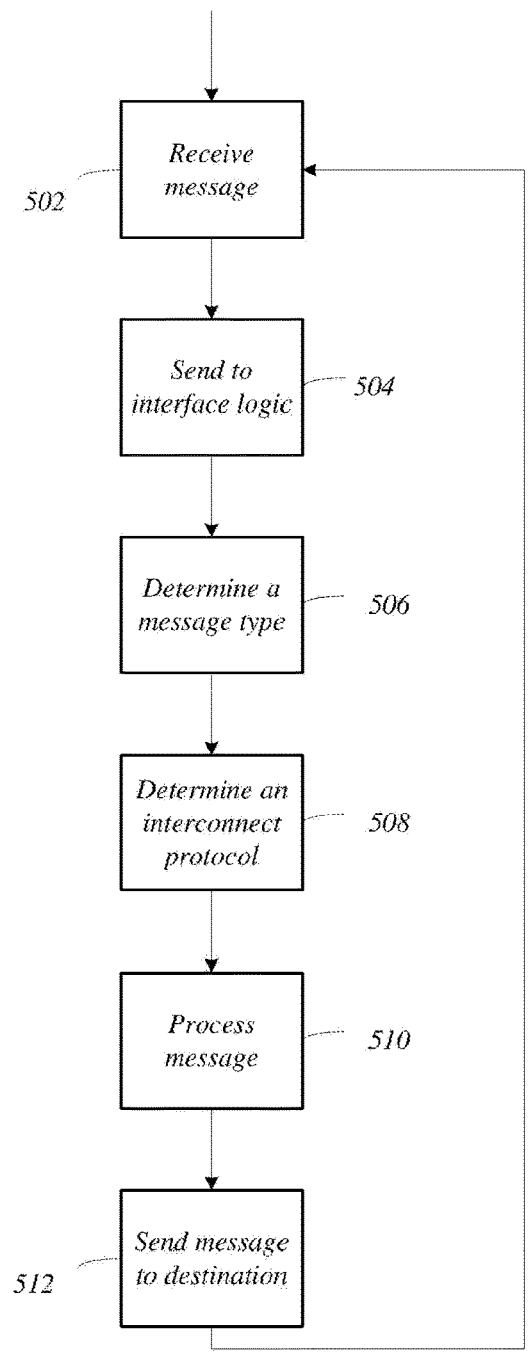
FIG. 5 illustrates an example of a second logic flow diagram.

FIG. 5 illustrates a first logic flow diagram 500 for processing a message and data received by a host processor. Although the logic flow diagram 500 illustrates certain operations are occurring in a particular order, embodiments are not limited in this manner. Some operations may occur before or after other operations, and some may occur in parallel. Moreover, the logic flow 500 may be representative of some or all the operations executed by one or more embodiments described herein.

At block 502, embodiments include receiving and detecting a message or data to communicate via an interconnect. The message or data may be generated by a coupled device, such as an accelerator device. The message or data may be stored in interconnect protocol-specific protocol queue, and at block 504, the logic flow may include interface logic processing the message or data. Further and at block 506, the logic flow may include determining a message type of the message. For example, embodiments may include determining a message type, such as a non-coherent message type, a coherent message type, and a memory message type. The determination may be based on the message, information (address) associated with the message, actions/operations caused by the message, and so forth. At block 508, the logic flow 500 may include determining an interconnect protocol to process the message based on the message type. For example, embodiments may include determining to process the message utilizing one of a non-coherent interconnect protocol, a coherent interconnect protocol, and a memory interconnect protocol based on the message. A non-coherent message type may be processed via non-coherent interconnect protocol, a coherent message type may be processed via the coherent interconnect protocol, and a memory message type may be processed via the memory interconnect protocol, for example. Embodiments are not limited in this manner.

At block 510, the logic flow 500 may include processing the message or data in accordance with the interconnect protocol. More specifically, interface logic and circuitry may process the message in accordance with the determined interconnect protocol. At block 512, the logic flow 500 may include sending the message or data to the appropriate destination, e.g. a core, a cache, an I/O device, and so forth. Embodiments are not limited in this manner.

FIG. 6 illustrates a first logic flow diagram 600 for processing a message and data. Although the logic flow diagram 600 illustrates certain operations are occurring in a particular order, embodiments are not limited in this manner. Some operations may occur before or after other operations, and some may occur in parallel. Moreover, the logic flow 600 may be representative of some or all the operations executed by one or more embodiments described herein.

In embodiments, the logic flow 600 may include detecting a message to communicate via the interconnect at block 605. For example, interface logic and circuitry may detect a message to send via an interconnect to a coupled device. At block 610, the logic flow may include determining an interconnect protocol of the plurality of interconnect protocols to communicate the message via the interconnect based on the message. The interconnect protocol may be determined based on a message type, which may include a non-coherent message type, a coherent message type, a memory message type, and so forth. Embodiments are not limited in this manner.

At block 615, the logic flow 600 may include providing the message to the multi-protocol multiplexer, the multi-protocol multiplexer to communicate the message utilizing the interconnect protocol via the interconnect with the device. In embodiments, the multi-protocol multiplexer may determine whether resources are available for an interconnect specific protocol queue at the destination device. If resources are available, the multi-protocol multiplexer may cause the message to be sent to the device via the interconnect. If resources are not available, the multi-protocol multiplexer may wait until resources are available and send the message. Embodiments are not limited in this manner.

Figure 7:
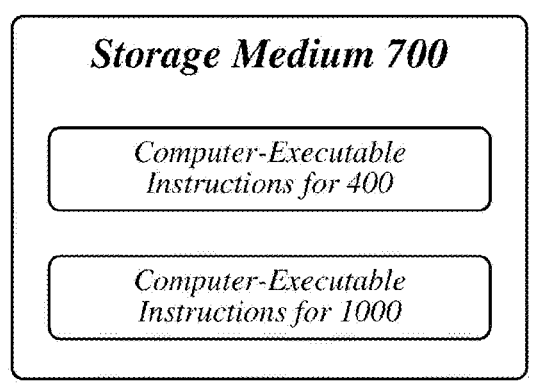
FIG. 7 illustrates an example of a storage medium.

FIG. 7 illustrates an example of a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer-executable instructions, such as instructions to implement logic flows 400, 500, and 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
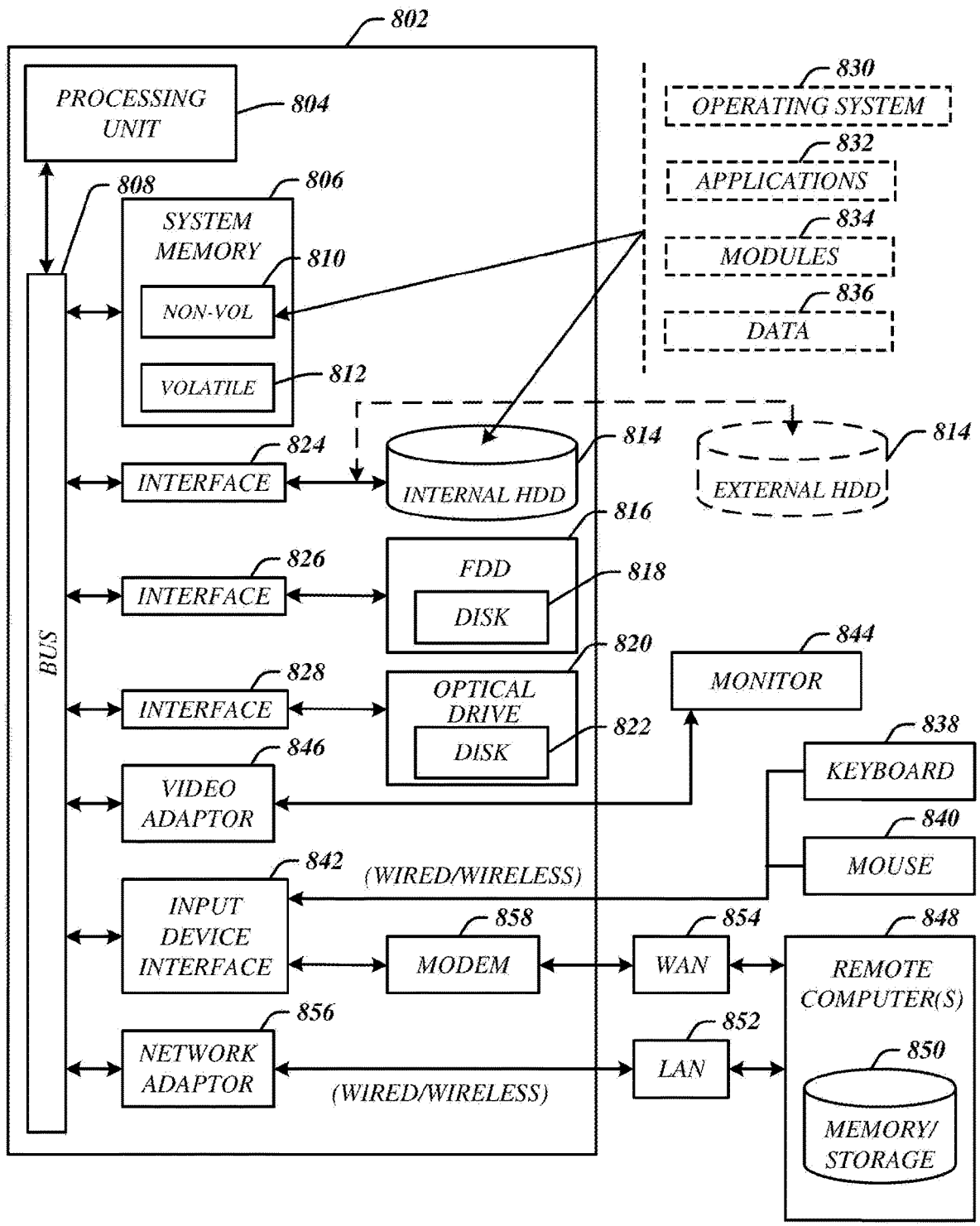
FIG. 8 illustrates an example of a computer architecture.

FIG. 8 illustrates an embodiment of an exemplary computing architecture 800 suitable for implementing various embodiments as previously described. In various embodiments, the computing architecture 800 may comprise or be implemented as part of an electronic device. In some embodiments, the computing architecture 800 may be representative, for example, of apparatuses and devices illustrated in FIG. 1-3. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi processor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1384 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components systems 100, 200, and 300.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1384 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The detailed disclosure now turns to providing examples that pertain to further embodiments. Examples one through thirty-two provided below are intended to be exemplary and non-limiting.

In a first example, embodiments may include an apparatus, device, circuitry, system, and so forth to provide dynamic multi-protocol communication including an interconnect coupled with a device, the interconnect capable of communication via a plurality of interconnect protocols, the plurality of interconnect protocols comprising a non-coherent interconnect protocol, a coherent interconnect protocol, and a memory interconnect protocol. The apparatus, device, circuitry, system, and so forth may include interface logic coupled with the interconnect and a multi-protocol multiplexer, the interface logic at least partially implemented in hardware, to detect a message to communicate via the interconnect, determine an interconnect protocol of the plurality of interconnect protocols to communicate the message via the interconnect based on the message, and provide the message to the multi-protocol multiplexer, the multi-protocol multiplexer to communicate the message utilizing the interconnect protocol via the interconnect with the device.

In a second example and furtherance of any other example, embodiments may include an apparatus, device, circuitry, system, and so forth including the interface logic to determine the message is an input/output (I/O) message based on a lookup in an address map, and determine the interconnect protocol is the non-coherent interconnect protocol based on the message.

In a third example and furtherance of any other example, embodiments may include an apparatus, device, circuitry, system, and so forth including the interface logic to determine the I/O message is for the device coupled via the interconnect based on an address associated with the I/O message and the lookup in the address map, and provide the I/O message to the multi-protocol multiplexer to communicate to the device.

In a fourth example and furtherance of any other example, embodiments may include an apparatus, device, circuitry, system, and so forth including the interface logic to determine the message is a memory message for the device based on a lookup in an address map, and determine the interconnect protocol is the memory interconnect protocol based on the message.

In a fifth example and furtherance of any other example, embodiments may include an apparatus, device, circuitry, system, and so forth including the interface logic to determine the memory message is for the device coupled via the interconnect based on an address associated with the memory message and the lookup in the address map, and provide the memory message to the multi-protocol multiplexer to communicate to the device.

In a sixth example and furtherance of any other example, embodiments may include an apparatus, device, circuitry, system, and so forth including the interface logic to determine the message is a coherent message for the device based on performance of one or more cache coherency and memory access actions, and determine the interconnect protocol is the coherent interconnect protocol based on the message.

In a seventh example and furtherance of any other example, embodiments may include an apparatus, device, circuitry, system, and so forth including the multi-protocol multiplexer coupled with the interconnect, the multi-protocol multiplexer to communicate the message based on resource availability of a protocol queue associated with the interconnect protocol at the device.

In an eighth example and furtherance of any other example, embodiments may include an apparatus, device, circuitry, system, and so forth including the interface logic to dynamically switch between the plurality of interconnect protocols to cause communication of a plurality of messages via the interconnect, the multi-protocol multiplexer to communicate each of the plurality of messages in accordance with one of the interconnect protocols based on each of the plurality of messages.

In a ninth example and in furtherance of any other example, a non-transitory computer-readable storage medium, comprising a plurality of instructions, that when executed, enable processing circuitry to detect a message to communicate via an interconnect coupled with a device, the interconnect capable of communication via a plurality of interconnect protocols, the plurality of interconnect protocols comprising a non-coherent interconnect protocol, a coherent interconnect protocol, and a memory interconnect protocol, determine an interconnect protocol of the plurality of interconnect protocols to communicate the message via the interconnect based on the message, and provide the message to a multi-protocol multiplexer coupled with the interconnect, the multi-protocol multiplexer to communicate the message utilizing the interconnect protocol via the interconnect with the device.

In a tenth example and in furtherance of any other example, a non-transitory computer-readable storage medium, comprising a plurality of instructions, that when executed, enable processing circuitry to determine the message is an input/output (I/O) message based on a lookup in an address map; and determine the interconnect protocol is the non-coherent interconnect protocol based on the message.

In an eleventh example and in furtherance of any other example, a non-transitory computer-readable storage medium, comprising a plurality of instructions, that when executed, enable processing circuitry to determine the I/O message is for the device coupled via the interconnect based on an address associated with the I/O message and the lookup in the address map; and provide the I/O message to the multi-protocol multiplexer to communicate to the device.

In a twelfth example and in furtherance of any other example, a non-transitory computer-readable storage medium, comprising a plurality of instructions, that when executed, enable processing circuitry to determine the message is a memory message for the device based on a lookup in an address map, and determine the interconnect protocol is the memory interconnect protocol based on the message.

In a thirteenth example and in furtherance of any other example, a non-transitory computer-readable storage medium, comprising a plurality of instructions, that when executed, enable processing circuitry to determine the memory message is for the device coupled via the interconnect based on an address associated with the memory message and the lookup in the address map, and provide the memory message to the multi-protocol multiplexer to communicate to the device.

In a fourteenth example and in furtherance of any other example, a non-transitory computer-readable storage medium, comprising a plurality of instructions, that when executed, enable processing circuitry to determine the message is a coherent message for the device based on performance of one or more cache coherency and memory access actions, and determine the interconnect protocol is the coherent interconnect protocol based on the message.

In a fifteenth example and in furtherance of any other example, a non-transitory computer-readable storage medium, comprising a plurality of instructions, that when executed, enable processing circuitry to process information via the multi-protocol multiplexer to communicate the message based on resource availability of a protocol queue associated with the interconnect protocol at the device.

In a sixteenth example and in furtherance of any other example, a non-transitory computer-readable storage medium, comprising a plurality of instructions, that when executed, enable processing circuitry to dynamically switch between the plurality of interconnect protocols to cause communication of a plurality of messages via the interconnect, the multi-protocol multiplexer to communicate each of the plurality of messages in accordance with one of the interconnect protocols based on each of the plurality of messages.

In a seventeenth example and in furtherance of any other example, a method may include detecting a message to communicate via an interconnect coupled with a device, the interconnect capable of communication via a plurality of interconnect protocols, the plurality of interconnect protocols comprising a non-coherent interconnect protocol, a coherent interconnect protocol, and a memory interconnect protocol, determining an interconnect protocol of the plurality of interconnect protocols to communicate the message via the interconnect based on the message, and providing the message to a multi-protocol multiplexer coupled with the interconnect, the multi-protocol multiplexer to communicate the message utilizing the interconnect protocol via the interconnect with the device.

In an eighteenth example and in furtherance of any other example, a method may include determining the message is an input/output (I/O) message based on a lookup in an address map, and determining the interconnect protocol is the non-coherent interconnect protocol based on the message.

In a nineteenth example and in furtherance of any other example, a method may include determining the I/O message is for the device coupled via the interconnect based on an address associated with the I/O message and the lookup in the address map, and providing the I/O message to the multi-protocol multiplexer to communicate to the device.

In a twentieth example and in furtherance of any other example, a method may include determining the message is a memory message for the device based on a lookup in an address map, and determining the interconnect protocol is the memory interconnect protocol based on the message.

In a twenty-first example and in furtherance of any other example, a method may include determining the memory message is for the device coupled via the interconnect based on an address associated with the memory message and the lookup in the address map, and providing the memory message to the multi-protocol multiplexer to communicate to the device.

In a twenty-second example and in furtherance of any other example, a method may include determining the message is a coherent message for the device based on performance of one or more cache coherency and memory access actions, and determining the interconnect protocol is the coherent interconnect protocol based on the message.

In a twenty-third example and in furtherance of any other example, a method may include communicating, via the multi-protocol multiplexer, the message based on resource availability of a protocol queue associated with the interconnect protocol at the device.

In a twenty-fourth example and in furtherance of any other example, a method may include dynamically switching between the plurality of interconnect protocols to cause communication of a plurality of messages via the interconnect, the multi-protocol multiplexer to communicate each of the plurality of messages in accordance with one of the interconnect protocols based on each of the plurality of messages.

In a twenty-fifth example and in furtherance of any other example, an apparatus may include means for detecting a message to communicate via an interconnect coupled with a device, the interconnect capable of communication via a plurality of interconnect protocols, the plurality of interconnect protocols comprising a non-coherent interconnect protocol, a coherent interconnect protocol, and a memory interconnect protocol, means for determining an interconnect protocol of the plurality of interconnect protocols to communicate the message via the interconnect based on the message, and means for providing the message to a multi-protocol multiplexer coupled with the interconnect, the multi-protocol multiplexer to communicate the message utilizing the interconnect protocol via the interconnect with the device.

In a twenty-sixth example and in furtherance of any other example, an apparatus may include means for determining the message is an input/output (I/O) message based on a lookup in an address map, and means for determining the interconnect protocol is the non-coherent interconnect protocol based on the message.

In a twenty-seventh example and in furtherance of any other example, an apparatus may include means for determining the I/O message is for the device coupled via the interconnect based on an address associated with the I/O message and the lookup in the address map, and means for providing the I/O message to the multi-protocol multiplexer to communicate to the device.

In a twenty-eighth example and in furtherance of any other example, an apparatus may include means for determining the message is a memory message for the device based on a lookup in an address map, and means for determining the interconnect protocol is the memory interconnect protocol based on the message.

In a twenty-ninth example and in furtherance of any other example, an apparatus may include means for determining the memory message is for the device coupled via the interconnect based on an address associated with the memory message and the lookup in the address map, and means for providing the memory message to the multi-protocol multiplexer to communicate to the device.

In a thirtieth example and in furtherance of any other example, an apparatus may include means for determining the message is a coherent message for the device based on performance of one or more cache coherency and memory access actions, and means for determining the interconnect protocol is the coherent interconnect protocol based on the message.

In a thirty-first example and in furtherance of any other example, an apparatus may include means for communicating the message based on resource availability of a protocol queue associated with the interconnect protocol at the device.

In a thirty-second example and in furtherance of any other example, an apparatus may include means for dynamically switching between the plurality of interconnect protocols to cause communication of a plurality of messages via the interconnect, the multi-protocol multiplexer to communicate each of the plurality of messages in accordance with one of the interconnect protocols based on each of the plurality of messages.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and "coupled" to indicate that two or more elements are in direct physical or electrical contact with each other. The term "coupled," however, may also mean that two or more elements are not in direct contact with each other, but still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. Also, in the preceding Detailed Description, various features are grouped together in a single embodiment for streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are at this moment incorporated into the Detailed Description, with each claim standing on its own as a separate embodiment. In the appended claims, the terms "including" and "in which" are used as the Plain-English equivalents of the respective terms "comprising" and "wherein," respectively. Moreover, the terms "first," "second," "third," and so forth, are used merely as labels and are not intended to impose numerical requirements on their objects.

What has been described above includes examples of the disclosed architecture? It is, of course, not possible to describe every conceivable combination of components and methodologies, but one of ordinary skill in the art may recognize that many further combinations and permutations are possible. Accordingly, the novel architecture is intended to embrace all such alterations, modifications, and variations that fall within the spirit and scope of the appended claims.

What is claimed is:

1. An apparatus comprising:
    an interface logic to receive message information, the message information comprising at least one of first information or second information;
    a multi-protocol multiplexer coupled to the interface logic to receive at least one of the first information of a first interconnect protocol or the second information of a second interconnect protocol, the multi-protocol multiplexer to direct the at least one of the first information or the second information to physical layer circuitry; and
    the physical layer circuitry coupled to the multi-protocol multiplexer, wherein the physical layer circuitry is to receive the at least one of the first information or the second information and output at least one packet on a link,
    wherein:
        for the first interconnect protocol, the physical layer circuitry is to receive the first information and output a first packet comprising the first information, the first interconnect protocol comprising a non-coherent protocol comprising a Peripheral Component Interconnect Express protocol; and
        for the second interconnect protocol, the physical layer circuitry is to receive the second information and output a second packet comprising the second information, the second interconnect protocol comprising a coherent protocol, and for a third interconnect protocol, the physical layer circuitry further is to receive third information of the third interconnect protocol and output a third packet comprising the third information, the third interconnect protocol comprising a memory interconnect protocol.

2. The apparatus of claim 1, wherein the physical layer circuitry is to receive the first information comprising a work submission.

3. The apparatus of claim 1, wherein the physical layer circuitry is to receive the first information comprising flow control information.

4. The apparatus of claim 1, wherein the coherent protocol comprises a cache coherency protocol.

5. The apparatus of claim 4, wherein the apparatus is to support execution of one or more atomic operations.

6. The apparatus of claim 1, wherein the physical layer circuitry is to receive fourth information of a fourth interconnect protocol and output a fourth packet comprising the fourth information, the fourth interconnect protocol comprising a non-coherent link input/output (io) protocol.

7. The apparatus of claim 6, wherein the physical layer circuitry is to receive the fourth information of the fourth interconnect protocol when the apparatus is to couple to a software assisted memory device.

8. The apparatus of claim 6, wherein the physical layer circuitry further is to receive the second information of the second interconnect protocol, the second interconnect protocol comprising the coherent protocol comprising a cache coherency protocol when the apparatus is to couple to a software assisted memory device.

9. The apparatus of claim 1, wherein the physical layer circuitry is to receive fourth information of a fourth interconnect protocol and output a fourth packet comprising the fourth information, the fourth interconnect protocol comprising a non-coherent link input/output (io) protocol when the apparatus is to couple to a cache device.

10. The apparatus of claim 1, wherein the physical layer circuitry is to dynamically output the second information of the second interconnect protocol and the third information of the third interconnect protocol.

11. The apparatus of claim 1, wherein the apparatus is to access bias mode information.

12. A method comprising:
  receiving, in an interface logic, information comprising at least one of first information or second information;
  receiving, in a multi-protocol multiplexer, from the interface logic coupled to the multi-protocol multiplexer, at least one of the first information of a first interconnect protocol or the second information of a second interconnect protocol, the multi-protocol multiplexer to direct the at least one of the first information or the second information to physical layer circuitry (PHY) of an integrated circuit; and
  receiving, in the PHY from the multi-protocol multiplexer coupled to the PHY, at least one of the first information or the second information; and
  sending at least one of the first information or the second information in at least one packet, from the PHY, to a destination component via a link, wherein:
  for the first interconnect protocol, sending the first information comprises sending a first packet according to the first interconnect protocol, the first interconnect protocol comprising a non-coherent protocol comprising a Peripheral Component Interconnect Express protocol;
  for the second interconnect protocol, sending the second information comprises sending a second packet according to the second interconnect protocol comprising a coherent protocol; and
  for a third interconnect protocol, sending a third packet according to the third interconnect protocol comprising a memory interconnect protocol.

13. The method of claim 12, further comprising for the first interconnect protocol, receiving the first information comprising a work submission.

14. The method of claim 12, further comprising for the first interconnect protocol, receiving the first information comprising flow control information.

15. The method of claim 12, further comprising for the second interconnect protocol, receiving the second information comprising one or more atomic operations.

16. The method of claim 12, further comprising accessing bias mode information.

17. A system comprising:
  a host processor having at least one core and an interface circuit, the interface circuit comprising:
    a multi-protocol multiplexer coupled to receive first information of a first interconnect protocol and second information of a second interconnect protocol, the multi-protocol multiplexer to direct at least one of the first information or the second information to physical layer circuitry; and
    the physical layer circuitry coupled to the multi-protocol multiplexer, wherein:
      for the first interconnect protocol, the physical layer circuitry is to receive the first information and output a first packet comprising the first information, the first interconnect protocol comprising a non-coherent protocol comprising a Peripheral Component Interconnect Express protocol; and
      for the second interconnect protocol, the physical layer circuitry is to receive the second information and output a second packet comprising the second information, the second interconnect protocol comprising a coherent protocol, and for a third interconnect protocol, the physical layer circuitry further is to receive third information of the third interconnect protocol and output a third packet comprising the third information, the third interconnect protocol comprising a memory interconnect protocol; and
  an accelerator coupled to the host processor.

18. The system of claim 17, wherein the physical layer circuitry is to dynamically output the second information of the second interconnect protocol and the third information of the third interconnect protocol.

19. The system of claim 17, wherein the host processor is to access bias mode information.

20. The system of claim 17, further comprising an add-in device comprising the accelerator, the add-in device adapted to a slot.

* * * * *